United States Patent [19]

Lu

[11] Patent Number: 4,621,119
[45] Date of Patent: Nov. 4, 1986

[54] POLYPROPYLENE-POLYETHYLENE-(ETHYLENE-PROPYLENE RUBBER) COMPOSITIONS AND FILMS THEREOF WITH IMPROVED TEAR STRENGTH

[75] Inventor: Pang-Chia Lu, Pittsford, N.Y.

[73] Assignee: Mobil Oil Corporation, New York, N.Y.

[21] Appl. No.: 686,810

[22] Filed: Dec. 27, 1984

[51] Int. Cl.⁴ .............................................. C08L 23/04
[52] U.S. Cl. .................................. 525/240; 428/500; 428/910
[58] Field of Search ....................... 428/516, 500, 910; 525/240

[56] References Cited

U.S. PATENT DOCUMENTS

| | | | |
|---|---|---|---|
| 3,998,911 | 12/1976 | Strametz et al. | 525/240 |
| 4,087,485 | 5/1978 | Huff | 525/240 |
| 4,319,004 | 3/1982 | Spielau | 525/240 |
| 4,399,180 | 8/1983 | Briggs et al. | 428/212 |
| 4,426,498 | 1/1984 | Inoue et al. | 525/240 |

*Primary Examiner*—Edith Buffalow
*Attorney, Agent, or Firm*—Alexander J. McKillop; Michael G. Gilman; Edward J. Trojnar

[57] ABSTRACT

The tear strength of biaxially oriented polypropylene is improved by adding polyethylene, e.g., about 5–40 weight percent, and an ethylene propylene rubber, e.g., about 1–10 weight percent.

8 Claims, No Drawings

POLYPROPYLENE-POLYETHYLENE-(ETHYLENE-PROPYLENE RUBBER) COMPOSITIONS AND FILMS THEREOF WITH IMPROVED TEAR STRENGTH

BACKGROUND OF THE INVENTION

Oriented polypropylene film has become a useful and widely used packaging material because of its good moisture barrier properties, stiffness, optical properties and other desirable physical properties. However, oriented polypropylene films usually exhibit low tear strength. In accordance with this invention, polypropylene compositions which exhibit improved tear strengths are provided.

SUMMARY OF THE INVENTION

The addition of minor amounts of low density polyethylene or linear low density copolymers of ethylene and higher olefins, and an ethylene propylene rubber to polypropylene results in a composition which can be formed into a biaxially oriented film having the advantageous properties of biaxially oriented polypropylene alone but having improved tear strength.

DETAILED DESCRIPTION OF THE INVENTION

The compositions of this invention comprise a major proportion of polypropylene and amounts of a low-density polyethylene (LDPE) or a linear low density polyethylene (LLDPE) comprising a copolymer of ethylene and an aliphatic monoolefin having 4 to 8 carbon atoms; and an ethylene-propylene rubber effective to improve the tear strength of a film made from the composition compared to the film absent the ethylene polymer and the ethylene-propylene rubber.

Preferably, the proportions of the various components are:

(a) 51–94 weight percent of polypropylene;
(b) 5–40 weight percent of the LDPE or LLDPE; and
(c) 1–10 weight percent of the ethylene-propylene rubber.

Most preferably, the polypropylene comprises 65–89 weight percent; the LDPE or LLDPE comprises 10–25 weight percent; and the ethylene propylene rubber comprises 1–10 weight percent of the composition.

The polypropylene (PP) referred to herein includes any of the known homopolymers polymers of this class, as well as ethylene-propylene copolymers having a high propylene content which is generally above 90 weight percent. Ethylene-propylene copolymers with a propylene content of about 97 weight have been found to be suitable, many of which are commercially available.

The low density polyethylene used in accordance with this invention is an ethylene polymer made by high pressure polymerization. Such materials are widely commercially avaiable.

The term linear low density polyethylene (LLDPE) as used herein refers to copolymers of ethylene and an alpha-olefin having 4 to 10 carbon atoms. Representative alpha-olefins include butene, hexene and octene. Generally, the LLDPE contains up to about 10 weight percent of polymerized alpha-olefin, has a density of 0.9 to 0.94 and a melt index of 0.2 to 10. The preparation of LLDPE is described in U.S. Pat. No. 4,076,698 which is incorporated herein by reference. A variety of LLDPE resins are commercially available. Ethylene-propylene rubbers (EPM) are also commercially available.

The blends of this invention can be physical blends of pellets of the separate ingredient or melt blends. The blends in either case are intended to ultimate formation into articles such as films having the improved tear strength which I have discovered.

This invention is illustrated by the following examples in which all parts are by weight unless otherwise specified.

EXAMPLES 1–2

The following polymer blend samples were cast extruded into sheet and then molded on a hot press into 20 mil plaques. The molded samples were then biaxially oriented on a T.M. Long Orientor at 330° F. (oven temperature), by five times on each direction. The physical properties of the oriented films were measured, and are listed below.

| EXAMPLE | C-1 | C-2 | C-3 | 1 | C-4 | 2 |
|---|---|---|---|---|---|---|
| PP | 100 | 97 | 85 | 82 | 85 | 82 |
| LDPE | — | — | 15 | 15 | — | — |
| LLDPE | — | — | — | — | 15 | 15 |
| EPM | — | 3 | — | 3 | — | 3 |
| Break Strength (psi) | 14,400 | 19,000 | 16,300 | 17,500 | 15,300 | 14,600 |
| % Elongation | 59 | 42 | 62 | 85 | 49 | 74 |
| Elmendorf Tear (g/mil) | 3.8 | 6.4 | 13.3 | 20.8 | 12.3 | 26.4 |

PP — Polypropylene W-472 from Arco.
LDPE — Low density polyethylene LLA-533 from Mobil.
DPE — Ethylene-butene copolymer 0.92 density.
EPM — Ethylene propylene rubber EPM-306 from Polysar.

Although the present invention has been described with preferred embodiments, it is to be understood that modifications and variations may be restored to, without departing from the spirit and scope of this invention, as those skilled in the art will readily understand. Such modifications and variations are considered to be within the purview and scope of the appended claims.

I claim:

1. A biaxially oriented polypropylene film comprising
   (a) 51–94 weight percent of polypropylene;
   (b) 5–40 weight percent of a linear low density polyethylene (LLDPE) comprising a copolymer of ethylene and an aliphatic monoolefin having 4 to 8 carbon atoms; and
   (c) 1–10 weight percent of an ethylene-propylene rubber;

said film having improved tear strength compared to the film absent the (b) and (c) components.

2. The film of claim 1 in which the proportions of (a), (b) and (c) are:
   (a) 65–89 weight percent;
   (b) 10–25 weight percent; and
   (c) 1–10 weight percent.

3. The film of claim 1 in which the monoolefin in (b) is 1-butene.

4. The film of claim 1 in which the monoolefin in (b) is 1-hexane.

5. The film of claim 1 in which the monoolefin in (b) is 1-octene.

6. The film of claim 3 in which the monoolefin in (b) is 1-butene.

7. The film of claim 3 in which the monoolefin in (b) is 1-hexene.

8. The film of claim 3 in which the monoolefin in (b) is 1-octene.

* * * * *